(12) United States Patent
Croudace (10) Patent No.: US 11,180,257 B2
(45) Date of Patent: Nov. 23, 2021

(54) AIRCRAFT SEAT

(71) Applicant: SleeperTech PTY LTD, St Ives (AU)

(72) Inventor: Gordon Croudace, St Ives (AU)

(73) Assignee: SleeperTech PTY LTD, St. Ives (AU)

( * ) Notice: Subject to any disclaimer, the term of this patent is extended or adjusted under 35 U.S.C. 154(b) by 0 days.

(21) Appl. No.: 16/333,958

(22) PCT Filed: Sep. 15, 2017

(86) PCT No.: PCT/AU2017/000198
§ 371 (c)(1),
(2) Date: Mar. 27, 2019

(87) PCT Pub. No.: WO2018/049466
PCT Pub. Date: Mar. 22, 2018

(65) Prior Publication Data
US 2019/0308732 A1    Oct. 10, 2019

(30) Foreign Application Priority Data
Sep. 15, 2016   (AU) ................................ 2016903717

(51) Int. Cl.
*B64D 11/06* (2006.01)
*B60N 2/66* (2006.01)

(52) U.S. Cl.
CPC ............ *B64D 11/064* (2014.12); *B60N 2/666* (2015.04); *B64D 11/0647* (2014.12); *B64D 11/06395* (2014.12)

(58) Field of Classification Search
CPC  B64D 11/064; B64D 11/0647; B60N 2/2222; B60N 2/2204; B60N 2/3031;
(Continued)

(56) References Cited

U.S. PATENT DOCUMENTS 3,463,544 A  *  8/1969  Froelich ................. B60N 2/666
                                                        297/284.7
6,779,845 B1 *  8/2004  Lin .......................... A47C 7/38
                                                        297/112
(Continued)

FOREIGN PATENT DOCUMENTS

DE          4228849 C1  * 10/1993   ............. B60N 2/853
EP          1400397 A2  *  3/2004   ........... B60N 2/4228
(Continued)

*Primary Examiner* — Timothy J Brindley
(74) *Attorney, Agent, or Firm* — Hamilton, Brook, Smith & Reynolds, P.C.

(57) ABSTRACT

An aircraft seat (10) comprising: a seat base (12) having a base support surface (22); an outer backrest (14) mounted to and extending upwardly from the seat base (12); an inner backrest (16) mounted to the outer backrest (14) and/or the seat base (12), the inner backrest (16) having a torso support surface (20) extending between a top end (26) and a bottom end (28) of the inner backrest (16) and being displaceable between a first position and a second position, wherein: when the inner backrest (16) is in the first position: the top end (26) of the inner backrest (16) is located adjacent to the outer backrest (14) and the bottom end (28) of the inner backrest (16) is located adjacent to the base support surface (22) of the seat base (12); and when the inner backrest (16) is in the second position: the top end (26) of the inner backrest (16) is located adjacent to the outer backrest (14) and the bottom end (28) of the inner backrest (16) is located adjacent to the base support surface (22) of the seat base (12), the top end (26) of the inner backrest (16) is located closer to the seat base (12) than when the inner backrest (16) is in the first position, and the bottom end (28) of the inner backrest (16) is located further away from the outer backrest (14) than when the inner backrest (16) is in the first position.

17 Claims, 8 Drawing Sheets

(58) Field of Classification Search
CPC .... B60N 2/3036; B60N 2/3093; B60N 2/666;
A47C 7/405; A47C 7/46
See application file for complete search history.

(56) References Cited

U.S. PATENT DOCUMENTS

| | | | | |
|---|---|---|---|---|
| 9,326,608 B1* | 5/2016 | Hoy | ............... | A47C 7/024 |
| 2003/0111888 A1* | 6/2003 | Brennan | ............... | B60N 2/753 |
| | | | | 297/316 |
| 2003/0197393 A1* | 10/2003 | Hanagan | ............. | B60N 2/3031 |
| | | | | 296/65.01 |
| 2009/0115235 A1* | 5/2009 | Bock | .............. | A47C 7/462 |
| | | | | 297/284.7 |
| 2011/0062757 A1* | 3/2011 | Colja | ............. | B60N 2/666 |
| | | | | 297/284.3 |
| 2014/0077542 A1* | 3/2014 | Vander Veen | ........... | A47C 3/30 |
| | | | | 297/228.11 |
| 2014/0375090 A1* | 12/2014 | Wegenka | ............... | B60R 7/043 |
| | | | | 297/188.09 |
| 2015/0036060 A1* | 2/2015 | Yaghoubi | ............... | H04N 5/655 |
| | | | | 348/837 |
| 2016/0052424 A1* | 2/2016 | Ferguson | ............... | F16H 21/40 |
| | | | | 297/344.1 |
| 2017/0021930 A1* | 1/2017 | Henshaw | ............. | B64D 11/064 |
| 2018/0170552 A1* | 6/2018 | Kirkley | .............. | B64D 11/0691 |
| 2018/0235371 A1* | 8/2018 | Chen | ......................... | A47C 7/46 |
| 2019/0167007 A1* | 6/2019 | Deevers | ................... | A47C 7/40 |

FOREIGN PATENT DOCUMENTS

| | | | | |
|---|---|---|---|---|
| EP | 2786892 A1 * | 10/2014 | ........... | B60N 2/0284 |
| EP | 2998157 B1 * | 7/2019 | .............. | B60N 2/66 |
| WO | WO-9614783 A1 * | 5/1996 | .............. | B64D 11/06 |
| WO | WO-2005095210 A1 * | 10/2005 | ......... | B64D 11/0606 |
| WO | WO-2008041040 A1 * | 4/2008 | ........... | B60N 2/2209 |

* cited by examiner

AIRCRAFT SEAT

CROSS-REFERENCE TO RELATED APPLICATIONS

The present application is a U.S. National Stage entry under 35 U.S.C. § 371 of International Application No. PCT/AU2017/000198 filed on Sep. 15, 2017, designating the United States of America and published in English on Mar. 22, 2018, which is hereby incorporated by reference in its entirety. International Application No. PCT/AU2017/000198 claims priority to Australian Application No. 2016903717, filed on Sep. 15, 2016, which is hereby incorporated by reference in its entirety.

FIELD

The present invention relates to aircraft seats and in particular relates to, but is not limited to, economy and premium economy class aircraft seats.

BACKGROUND

Reclining aircraft seats generally have an outer backrest that pivots relative to a seat base. The pivot point of reclining aircraft seats is usually located where the outer backrest and seat base join. The purpose of reclining an aircraft seat is to increase the backrest recline angle, thereby improving comfort, particularly for sleeping.

Cost pressures have led to the desire to increase the number of passengers an aircraft can carry, yet still maintain a certain level of comfort for those passengers. With the majority of passengers flying in economy class (otherwise known as coach class) style seating arrangements due to the high cost of business class and first class, developments have been made to improve the level of comfort in economy class and premium economy class, particularly on long haul flights.

For example, current economy class seating allows for the outer backrest to pivot relative to the seat base, thereby increasing the recline angle between the seat base and the outer backrest. This recline angle would generally influence the angle between the femur and spine of the user. The recline angle between the seat base and the outer backrest offered by current reclined economy class seats in aircraft is generally about 120°. When sitting in an aircraft seat, it can be assumed that the angle between the femur and the spine would generally correspond to the seat recline angle. However, studies have shown that stresses on the spine are most evenly distributed when resting with an angle of greater than 135°. Typical economy class and premium economy class seats do not allow for such seat recline angles, due to space restrictions and the desire to maximise the number of passengers. Seat recline angles greater than 135° are usually found in business class and first class seats, where the seat base can slide forward, thereby using the additional leg room in front of the passenger to create a bed.

It is an object of the invention to substantially overcome or at least ameliorate one or more of the above disadvantages.

SUMMARY OF INVENTION

The present invention provides an aircraft seat comprising: a seat base having a top support surface; an outer backrest mounted to and extending upwardly from the seat base; an inner backrest mounted to the outer backrest and/or the seat base, the inner backrest having a torso support surface extending between a top end and a bottom end of the inner backrest and being displaceable between a first position and a second position, wherein:
a) when the inner backrest is in the first position:
  i. the top end of the inner backrest is located adjacent to the outer backrest and the bottom end of the inner backrest is located adjacent to the base support surface of the seat base; and
b) when the inner backrest is in the second position:
  i. the top end of the inner backrest is located adjacent to the outer backrest and the bottom end of the inner backrest is located adjacent to the base support surface of the seat base,
  ii. the top end of the inner backrest is located closer to the seat base than when the inner backrest is in the first position, and
  iii. the bottom end of the inner backrest is located further away from the outer backrest than when the inner backrest is in the first position.

Preferably, the inner backrest is mounted to the outer backrest.

Preferably, the inner backrest is not mounted to the seat base.

Preferably, the inner backrest is pivotally and slidably mounted to the outer backrest.

Preferably, the outer backrest is pivotally displaceable relative to the seat base between an upright position and a reclined position.

Preferably, the inner backrest is displaceable between the first position and the second position when the outer backrest is in the reclined position.

Preferably, a recline angle formed between the torso support surface and the base support surface of the seat base is at least 135 degrees when the inner backrest is in the second position and the outer backrest is in the reclined position.

Preferably, the recline angle is between 140 degrees and 145 degrees when the inner backrest is in the second position and the outer backrest is in the reclined position.

Preferably, a head support surface is defined by the outer backrest above the inner backrest, when the inner backrest is in the second position.

Preferably, the head support surface is also defined by the outer backrest above the inner backrest when the inner backrest is in the first position.

Preferably, the aircraft seat further comprises a guide arrangement to guide the inner backrest between the first position and the second position.

Preferably, the guide arrangement comprises: a first guide member; a first guide follower, the first guide follower being displaceable along the first guide member to guide the top end of the inner backrest toward the seat base; a second guide member; and a second guide follower, the second guide follower being displaceable along the second guide member to guide the bottom end of the inner backrest away from the outer backrest as the top end of the inner backrest is guided toward the seat base.

In one form, the aircraft seat further comprises a mechanism to displace the inner backrest between the first position and the second position.

Preferably, the mechanism comprises a pneumatic, hydraulic or electromechanical actuator.

In an alternate form, the mechanism comprises a lever having a handle and a pivot, the lever being pivotally mounted to the outer backrest about the pivot and the lever being slidably mounted to the inner backrest at a location between the handle and the pivot.

In an alternate form, the inner backrest is manually displaceable between the first position and the second position.

BRIEF DESCRIPTION OF DRAWINGS

Preferred embodiments of the present invention will be described by way of examples only, with reference to the accompanying drawings.

DESCRIPTION OF EMBODIMENTS

FIGS. 1 to 4 show an aircraft seat 10 according to a first embodiment. The aircraft seat 10 has a seat base 12 and an outer backrest 14 mounted to and extending upwardly from the seat base 12. In the first embodiment, the aircraft seat 10 is a reclinable aircraft seat 10, in which the outer backrest 14 is pivotally displaceable relative to the seat base 12 between an upright position and a reclined position. In FIGS. 1 to 4, the outer backrest 14 is depicted in the reclined position. The aircraft seat 10 also has a cushioned inner backrest 16 mounted to the outer backrest 14. The inner backrest 16 has a torso support surface 20 extending between a top end 26 and a bottom end 28 of the inner backrest 16, to support the torso of a user. In the first embodiment, the inner backrest 16 is mounted to the outer backrest 14 only, such that it is not mounted to the seat base 12. It is however envisaged, in an alternative embodiment, that the inner backrest 16 may be mounted to the seat base 12 only, rather than the outer backrest 14. In another alternative embodiment, it is envisaged that the inner backrest 16 may be mounted to both the seat base 12 and the outer backrest 14.

Figure 1:
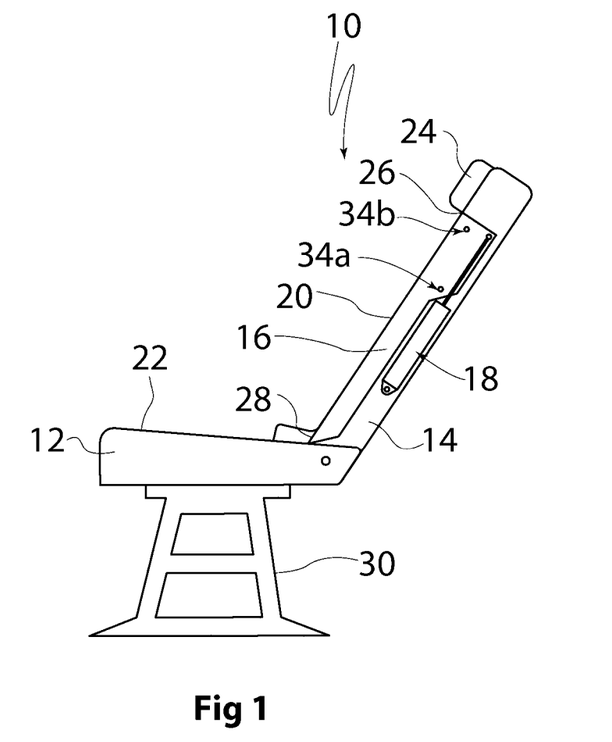
FIG. 1 is a schematic cross sectional view of an aircraft seat according to a first embodiment when the inner backrest is in a first position.
Figure 2:
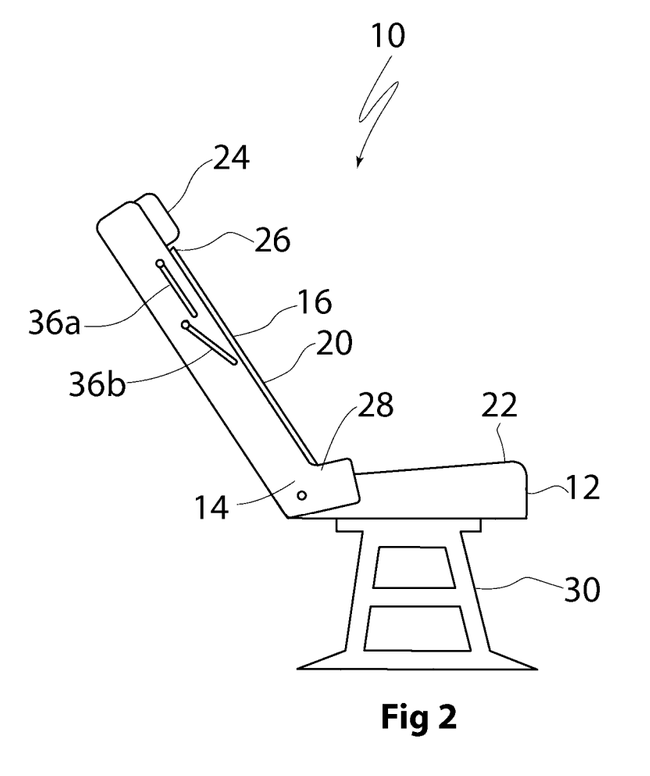
FIG. 2 is a schematic left side view of the aircraft seat shown in FIG. 1, when the inner backrest is in the first position.

The inner backrest 16 is displaceable between a first position and a second position. FIGS. 1 and 2 illustrate when the inner backrest 16 is in the first position, being a generally upright position. When the inner backrest 16 is in the first position, the top end 26 of the inner backrest 16 is located adjacent to the outer backrest 14 and the bottom end 28 of the inner backrest 16 is located adjacent to a base support surface 22 of the seat base 12. Accordingly, a substantially continuous support surface is formed by the torso support surface 20 of the inner backrest 16 and the base support surface 22 of the seat base 12. The inner backrest 16 will typically be positionable in the first position both when the outer backrest 14 is in the upright position and when the outer backrest 14 is in the reclined position.

Figure 3:
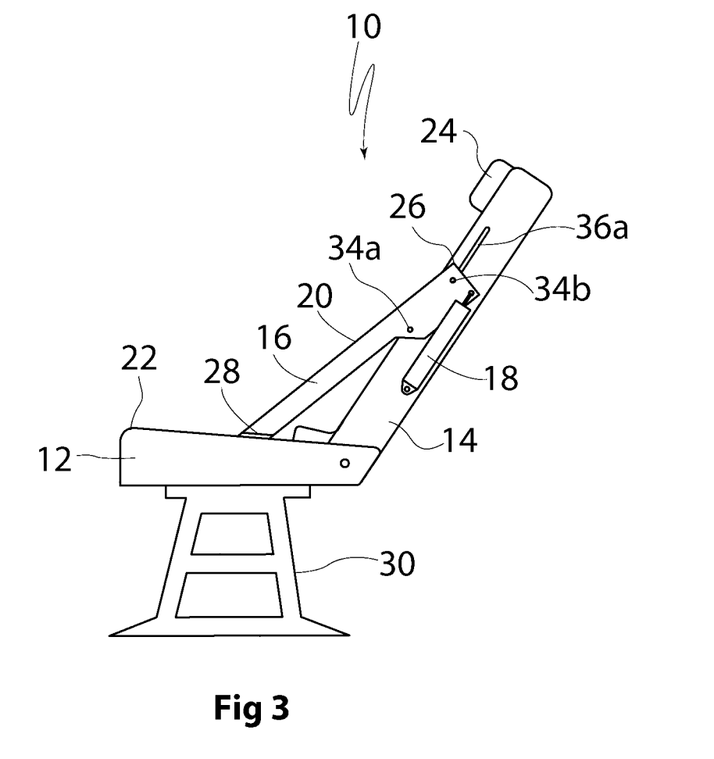
FIG. 3 is a schematic cross sectional view of the aircraft seat shown in FIG. 1, when the inner backrest is in a second position.
Figure 4:
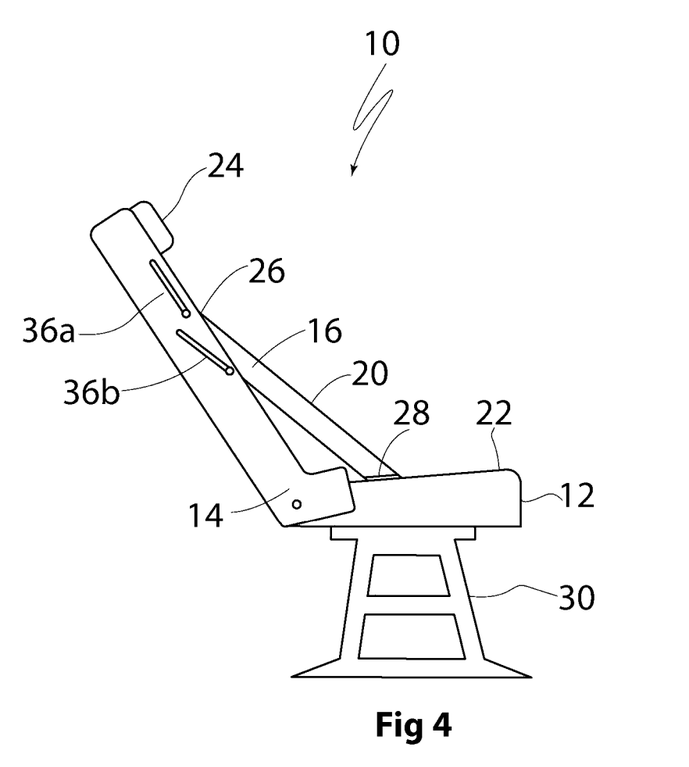
FIG. 4 is a schematic left side view of the aircraft seat shown in FIG. 1, when the inner backrest is in the second position.

FIGS. 3 and 4 illustrate when the inner backrest 16 is in the second position, being a generally reclined or sleeper position. When the inner backrest 16 is in the second position, the top end 26 of the inner backrest 16 is again located adjacent to the outer backrest 14 and the bottom end 28 of the inner backrest 16 is again located adjacent to the base support surface 22 of the seat base 12. Accordingly, the substantially continuous support surface defined by the torso support surface 20 of the inner backrest 16 and the base support surface 22 of the seat base 12 is maintained. Additionally, when the inner backrest 16 is in the second position, the top end 26 of the inner backrest 16 is located closer to the seat base 12 than when the inner backrest 16 is in the first position. Accordingly, as the inner backrest 16 is displaced from the first position to the second position, the top end 26 of the inner backrest 16 moves in a downward direction. When the inner backrest 16 is in the second position, the bottom end 28 of the inner backrest 16 is also located further away from the outer backrest 14 than when the inner backrest 16 is in the first position. Accordingly, as the inner backrest 16 is displaced from the first position to the second position, the bottom end 28 of the inner backrest 16 moves towards the front of the seat base 12. Thus, when the inner backrest 16 is in the second position, the torso support surface 20 is in a more reclined position than when the inner backrest 16 is in the first position, providing an increase in the angle between the torso support surface 20 and the base support surface 22.

Figure 5A:
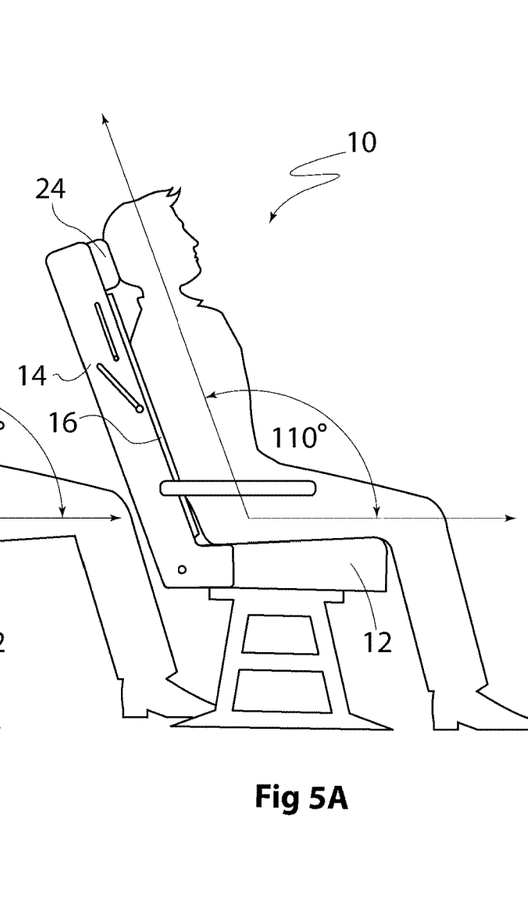
FIG. 5A is a left side view of the aircraft seat shown in FIG. 1 when the inner backrest is in the first position and the outer backrest is in the upright position.
Figures 5B, 5C:
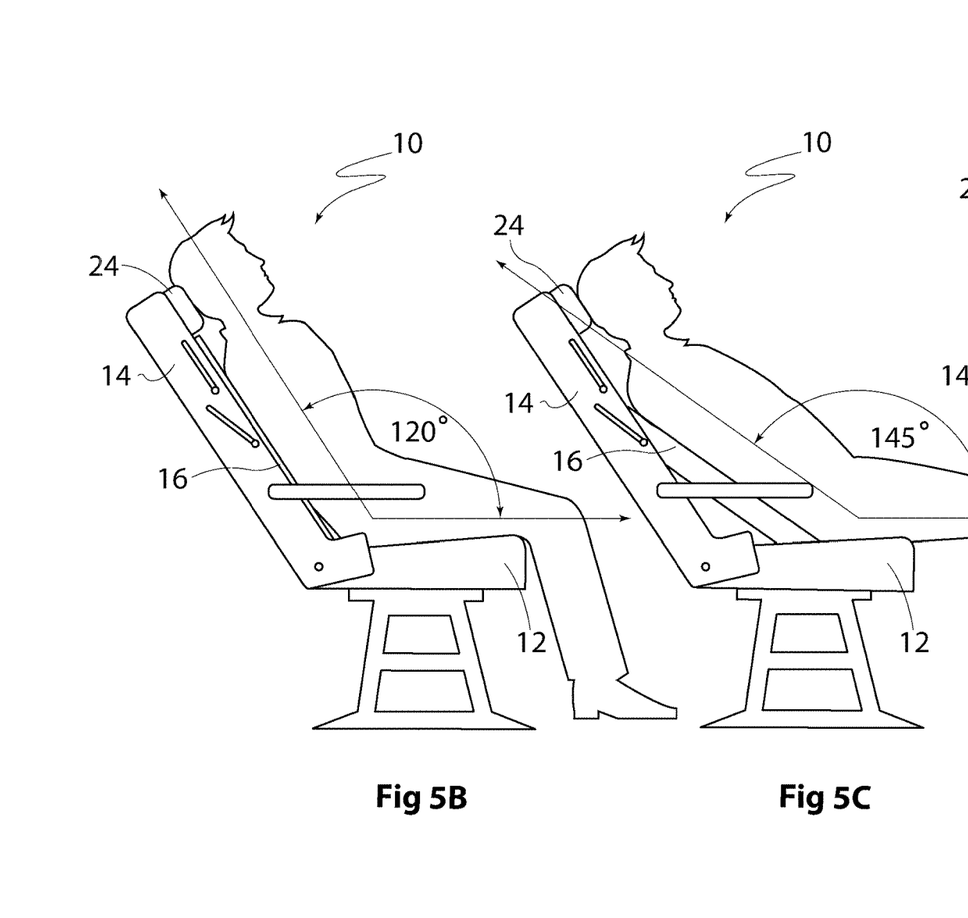
FIG. 5B is a left side view of an aircraft seat shown in FIG. 1 when the inner backrest is in the first position and the outer backrest is in the reclined position.
FIG. 5C is a left side view of an aircraft seat shown in FIG. 1 when the inner backrest is in the second position and the outer backrest is in the reclined position.

The recline angle formed between the torso support surface 20 and the base support surface 22 of the seat base 12 is typically at least 135 degrees, and preferably between 140 and 145 degrees, when the inner backrest 16 is in the second position and the outer backrest 14 is in the reclined position. In the first embodiment, as specifically shown in FIG. 5C, the recline angle is about 145 degrees. In contrast, when the inner backrest 16 is retained in the first position and the outer backrest 14 is in the reclined position, the recline angle is about 120 degrees, as shown in FIG. 5B. This recline angle generally corresponds to the maximum recline angle of regular reclinable economy class aircraft seats. Increasing the recline angle to at least 135 degrees serves to improve the user's comfort whilst resting in the aircraft seat and supporting the user's head, torso and legs.

A head support surface 24 is defined by the outer backrest 14 above the inner backrest 16. As shown in FIGS. 5A to 5C, the head support surface 24 supports the user's head and neck when the inner backrest 16 is in the first position, the second position or any intermediate position. Thus, a substantially continuous support surface is formed by the torso support surface 20 and the head support surface 24. Together with the base support surface 22, a substantially continuous support is thus provided for the user's head, torso and upper thighs. When the inner backrest 16 is in the second position, an increased area of the outer backrest 14 defining the head support surface is exposed above the top end 26 of the inner backrest 16. Therefore, the head support surface 24 increases in surface area, when the inner backrest 16 is displaced to the second position. A sufficient area of the outer backrest 14 is still exposed above the top end 26 of the inner backrest 16 when the inner backrest 16 is in the first position to define the head support surface 24. It is envisaged however, that the top end 26 of the inner backrest may be located close to the top of the outer backrest 14 when in the first position, such that an upper region of the inner backrest 16 adjacent to the top end 26 may form a head support surface and/or at least part of a head support surface.

In the first embodiment shown in FIGS. 1 to 4, the inner backrest 16 is pivotally and slidably mounted to the outer backrest 14 via a guide arrangement. The guide arrangement comprises a first guide member 36a, a first guide follower 34a, a second guide member 36b and a second guide follower 34b. The first guide follower 34a is displaceable along the first guide member 36a to guide the top end 26 of the inner backrest 16 toward the seat base 12. The second guide follower 34b is displaceable along the second guide member 36b to guide the bottom end 28 of the inner backrest 16 away from the outer backrest 14 as the top end 26 of the inner backrest 16 is guided toward the seat base 12. An identical guide arrangement may be provided on both sides of the outer backrest 14, to distribute the load on the inner backrest 16 appropriately. The first guide member 36a extends generally parallel to the front face of the outer backrest 14 and/or to the torso support surface 20 when the inner backrest 16 is in the first position. The second guide member 36b is angularly offset from the first guide member and is particularly configured to be inclined such that the bottom end of the second guide member 36b is closer to the torso support surface 20 than the top end of the guide member 36b. The guide members 36a and 36b may each be in the form of a track or a slot, whilst the guide followers 34a and 34b may each be in the form of a pin or a roller. Having the first and second guide members angularly offset also inhibits the inner backrest 16 from freely sliding downwards. The angular offset arrangement of the first guide member 36a and the second guide member 36b serves to maintain a desired recline angle when pressure is placed onto the torso support surface 20 by a user when sitting on the seat 10. The first and second guide followers 34a and 34b may also have a frictional engagement with the guide members 36a, 36b to further inhibit the inner backrest 16 from freely sliding downward.

In the first embodiment the guide arrangement is configured such that the top end 26 of the inner backrest 16 remains adjacent to the outer backrest 14 through the path the inner backrest 16 travels between the first and second positions. Similarly, the guide arrangement is also configured such that the bottom end 28 of the inner backrest 16 remains adjacent to the base support surface 22 through the path the inner backrest 16 travels between the first and second positions. Therefore, the continuous support surface formed by the torso support surface 20 and the base support surface 22 is maintained for all intermediate positions. It is envisaged, however, that the inner backrest 16 may be mounted such that the top and bottom ends 26 and 28 of the inner backrest 16 are only adjacent to the outer backrest 14 and the base support surface 22 respectively when the inner backrest 16 is in the first and second positions.

The seat base 12 is fixed to a seat mount 30 in the usual manner. The mount 30 serves to secure the aircraft seat 10 to the floor with fasteners or the like in the usual manner. The aircraft seat 10 will also typically have armrests (not depicted) coupled to the seat base 12 and/or outer backrest 14 in the usual manner.

FIGS. 5A to 5C show multiple positions of the aircraft seat 10 providing differing recline angles, formed between the torso support surface 20 and the base support surface 22 of the seat base 12. FIG. 5A shows the aircraft seat 10 with the outer backrest 14 in the upright position and the inner backrest in the first position, providing a recline angle of about 110 degrees. The user can then recline the outer backrest 14 without changing the position of the inner backrest 16, as shown in FIG. 5B, providing a recline angle of about 120 degrees. The recline angles shown in FIGS. 5A and 5B are typical in economy class and premium economy class seats. The recline angle may then be further increased, as shown in FIG. 5C by maintaining the outer backrest 14 of the aircraft seat 10 in the reclined position and displacing the inner backrest 16 to the second position. The configuration of FIG. 5C allows for a recline angle of about 145 degrees, which cannot be achieved by typical economy class and premium economy class seats. When the outer backrest 14 is in the upright position and the inner backrest 16 is in the second position, a recline angle of about 130 degrees will be provided. Whilst this is less than the recline angle when the outer backrest 14 is in a reclined position and the inner backrest 16 is in the second position, it is still greater than would otherwise be provided with a typical economy class or premium economy class seat with the backrest in the upright position.

When the user is sitting in the aircraft seat 10 and the inner backrest 16 is in the first position, the majority of the user's thigh is supported by the seat base 12. However, when the inner backrest 16 is in the second position, the user sits further forward along the seat base 12, such that a smaller portion of the user's thigh is supported. Additionally, the user's head slides downward with the inner backrest 16, however the user's head remains above the inner backrest 16 and remains in contact with the head support surface 24. Notably, the user's lumbar is continually supported when the inner backrest 16 is in the second position. Additionally, the angle between the user's spine and femur increases as the user's knees reach a position that is closer to the floor. It is also envisaged that the passenger's seat belt and/or foot rest will prevent the passenger from sliding forwards and off the seat base 12.

As best shown in FIGS. 1 and 3, the seat 10 has a mechanism to displace the inner backrest 16 between the first position and the second position. The mechanism is in the form of a linear actuator 18. A first end of the linear actuator 18 is coupled to the outer backrest 14, and a second end of the linear actuator 18 is coupled to the inner backrest 16 adjacent to the top end 26 and offset from the guide followers 34a and 34b. In the arrangement depicted, the linear actuator 18 is mounted within the structure of the outer backrest 14, such that it is not readily visible from the exterior of the seat 10. Specifically, the first end of the linear actuator 18 is coupled to an inwardly facing surface of an outer frame of the outer backrest 14. When the inner backrest 16 is in the first position, the actuator 18 is in an extended position. The actuator 18 can retract, such that the actuator 18 pulls the top end 26 of the inner backrest 16 towards the seat base 12, and accordingly, the bottom end 28 of the inner backrest 16 slides away from the outer backrest 14. Thus, when the actuator 18 is in a retracted position, the inner backrest 16 is in the second position.

Alternatively, the linear actuator 18 may be mounted in reverse and above the position depicted in FIG. 1. The first end of the linear actuator 18 may be coupled to the outer backrest 14 and adjacent to the headrest 24 and the second end of the linear actuator 18 may be coupled to the inner backrest 16 adjacent to the first guide member 36a. Thus, in this alternative, when the linear actuator 18 is in an extended position, the inner backrest 16 is in the second position and when the linear actuator 18 is in a retracted position, the inner backrest 16 is in the first position.

The actuator 18 may be mechanical, pneumatic, hydraulic or electrical. It is envisaged that any electric controls for the mechanism 18 that are configured to displace the inner backrest 16 between the first position and the second position may be integrated into the electric controls of the seat 10. In particular, the controls may be integrated into the outer backrest 16, the seat base 12 or armrests. The mechanism may include a lock to prevent the inner backrest 16 from displacing out of position. The control of the lock may also be integrated into the above described electric controls. In an alternative embodiment, the inner backrest 16 may be manually displaced by the user upon disconnection or removal of the actuator 18 and pulling forward the bottom end 28 of the inner backrest 16. In another embodiment, a linear screw actuator may replace one of the guide members and its associated guide follower, such that the ends of the linear screw actuator are coupled to the outer backrest 14 and the inner backrest 16 respectively. In such an embodiment the linear screw actuator is placed in the same location as the guide member it replaces and functions as both a guide and a mechanism to displace the inner backrest between the first position and the second position.

Figure 6:
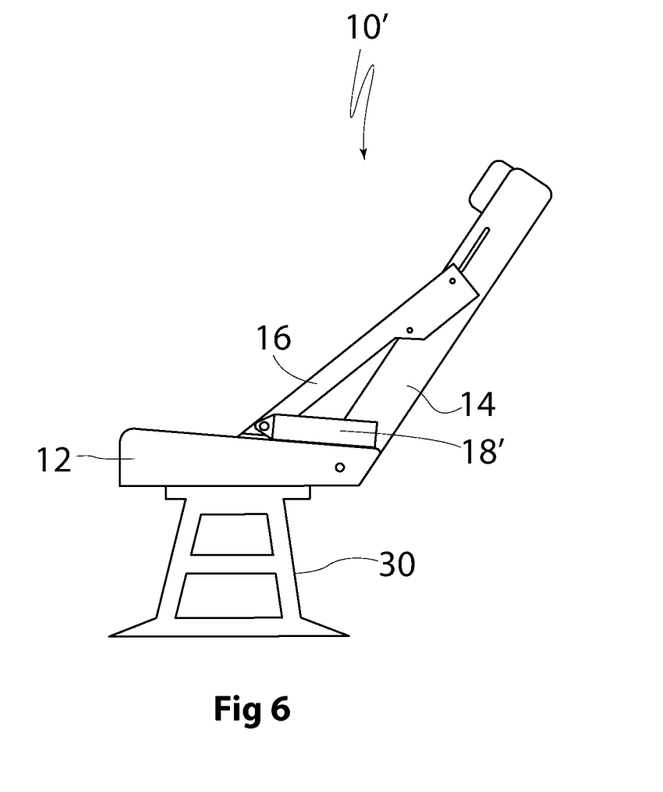
FIG. 6 is a schematic cross sectional view of an aircraft seat according to a second embodiment when the inner backrest is in the second position.
Figure 7:
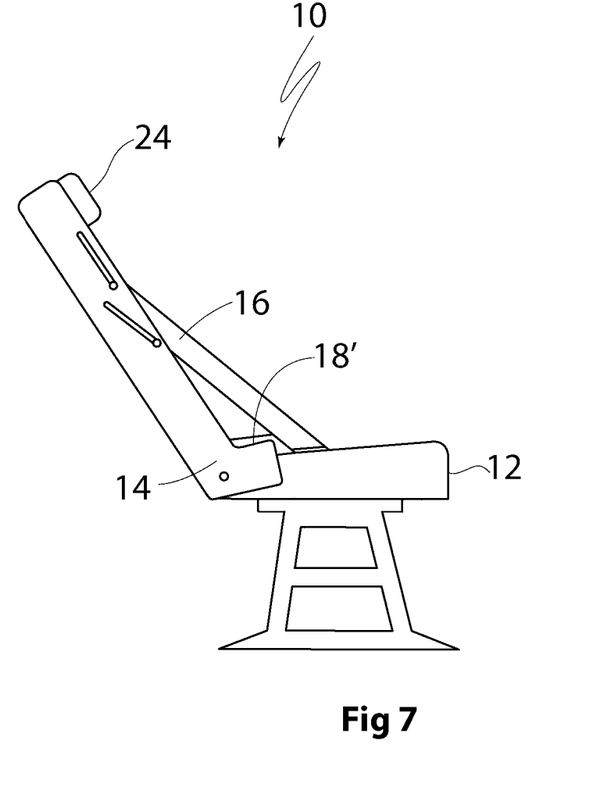
FIG. 7 is a schematic left side view of the aircraft seat shown in FIG. 6, when the inner backrest is in the second position.

FIGS. 6 and 7 show an aircraft seat 10' according to a second embodiment. The aircraft seat 10' is identical to the aircraft seat 10 according to the first embodiment, except that that mechanism for displacing the inner backrest 16 is in the form of an inflatable bellows 18'. A first end of the inflatable bellows 18' is coupled to the inner backrest 16 toward the bottom end 28 and a second end of the inflatable bellows 18' is coupled to the outer backrest 14, as shown in FIGS. 6 and 7. When the inflatable bellows 18' is deflated (not depicted), the inner backrest 16 of the aircraft seat 10' is located in the first position. When the inflatable bellows 18' is inflated, the inner backrest 16 of the aircraft seat 10' is displaced to the second position as shown in FIGS. 6 and 7.

Figure 8:
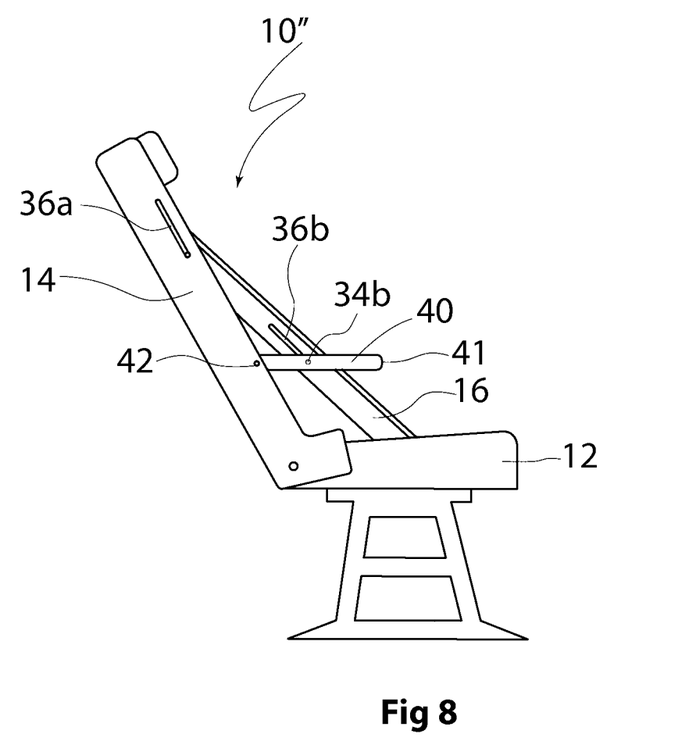
FIG. 8 is a schematic left side view of an aircraft seat according to a third embodiment when the inner backrest is in the second position.

FIG. 8 shows an aircraft seat 10" according to a third embodiment. The aircraft seat 10" is identical to the aircraft seat 10 according to the first embodiment, except that the mechanism to displace the inner backrest 16 between the first position and the second position is in the form of a lever 40, having a handle 41 and a pivot 42. The lever 40 may be used to manually displace the inner back rest 16 between the first position and the second position. In this embodiment, the lever 40 may be pivotally mounted at the lower side of the outer backrest 14 about the pivot 42. The second guide follower 34a may be relocated and mounted at a location between the handle 41 and the pivot 42 of the lever 40 such that the mounting location corresponds to a midpoint along the length of the lever 40. The second guide member 36b may be relocated and mounted at a location between the handle 41 and the pivot 42, the mounting location corresponding to a midpoint at the side of the inner backrest 16. The lever 40 is slidably mounted to the inner backrest 16 through the relocated second guide follower 34b and the relocated second guide member 36b. The user may push down on the handle 41 of the lever 40 protruding forward and beyond the side 16, such that the inner backrest 16 is displaced from the first position to the second position. The user may raise the lever 40 by pulling on the handle 41, such that the inner backrest 16 is displaced from the second position to the first position. Additionally, the protruding second end of the lever 40 may also be utilised as a secondary arm rest when the inner backrest 16 is in the second position.

Although the aircraft seat has been described with reference to preferred embodiments, it will be appreciated by persons skilled in the art that the invention can be embodied in other forms. For example, although the above embodiments are described in relation to an aircraft seat with a reclining outer backrest, alternative embodiments are envisaged where the outer backrest 14 is fixed in relation to the seat base 12. In an alternative embodiment where the inner backrest 16 is mounted to the seat base 12 rather than the outer backrest 14, an equivalent guide arrangement to that described in relation to the aircraft seat 10 of the first embodiment may be mounted to the seat base 12 and the outer backrest 14. In another alternative embodiment where the inner backrest is mounted to both the outer backrest 14 and the seat base 12, the first guide member 36a and the first guide follower 34a may be mounted to the outer backrest 14 to guide the top end 26 of the inner backrest 16 toward the seat base 12. In such an embodiment, the second guide member 36b and the second guide follower 34b may be mounted to the seat base 12 to guide the bottom end 28 of the inner backrest 16 away from the outer backrest 14 as the top end 26 of the inner backrest 16 is guided toward the seat base 12. In another embodiment the inflatable bellows 18' of the aircraft seat 10' of the second embodiment may be replaced by a chain or screw type actuator such that a first end of the chain or screw type actuator is coupled to the inner backrest 16 toward the bottom end 28 and a second end of the chain or screw type actuator is coupled to the outer backrest 14.

The invention claimed is:

1. An aircraft seat comprising:
a seat base having a base support surface;
an outer backrest mounted to and extending upwardly from the seat base;
an inner backrest mounted to the outer backrest and/or the seat base, characterised by the inner backrest having a torso support surface extending between a top end and a bottom end of the inner backrest and being displaceable between a first position and a second position, independently of the seat base;
a guide arrangement to guide the inner backrest between the first position and the second position, the guide arrangement having at least two angularly offset guide members to inhibit the inner backrest from freely moving, thereby maintaining a desired recline angle wherein:
a) when the inner backrest is in the first position:
i. the top end of the inner backrest is located adjacent to the outer backrest and the bottom end of the inner backrest is located adjacent to the base support surface of the seat base; and
b) when the inner backrest is in the second position:
i. the top end of the inner backrest is located adjacent to the outer backrest and the bottom end of the inner backrest is located adjacent to the base support surface of the seat base,
ii. the top end of the inner backrest is located closer to the seat base than when the inner backrest is in the first position, and
iii. the bottom end of the inner backrest is located further away from the outer backrest than when the inner backrest is in the first position.

2. The aircraft seat of claim 1, wherein the inner backrest is mounted to the outer backrest.

3. The aircraft seat of claim 2, wherein the inner backrest is not mounted to the seat base.

4. The aircraft seat of claim 2, wherein the inner backrest is pivotally and slidably mounted to the outer backrest.

5. The aircraft seat of claim 4, wherein the outer backrest is pivotally displaceable relative to the seat base between an upright position and a reclined position.

6. The aircraft seat of claim 5, wherein the inner backrest is displaceable between the first position and the second position when the outer backrest is in the reclined position and the upright position.

7. The aircraft seat of claim 6, wherein the recline angle formed between the torso support surface and the base support surface of the seat base is at least 135 degrees when the inner backrest is in the second position and the outer backrest is in the reclined position.

8. The aircraft seat of claim 7, wherein the recline angle is between 140 degrees and 145 degrees, when the inner backrest is in the second position and the outer backrest is in the reclined position.

9. The aircraft seat of claim 1, wherein a head support surface is defined by the outer backrest above the inner backrest, when the inner backrest is in the second position.

10. The aircraft seat of claim 9, wherein the head support surface is also defined by the outer backrest above the inner backrest when the inner backrest is in the first position.

11. The aircraft seat of claim 1, wherein the guide arrangement comprises:
the first guide member;
a first guide follower, the first guide follower being displaceable along the first guide member to guide the top end of the inner backrest toward the seat base;
the second guide member; and
a second guide follower, the second guide follower being displaceable along the second guide member to guide the bottom end of the inner backrest away from the outer backrest as the top end of the inner backrest is guided toward the seat base.

12. The aircraft seat of claim 1, further comprising a mechanism to displace the inner backrest between the first position and the second position.

13. The aircraft seat of claim 12, wherein the mechanism comprises a pneumatic, hydraulic or electromechanical actuator.

14. The aircraft seat of claim 12, wherein the mechanism comprises a lever having a handle and a pivot, the lever being pivotally mounted to the outer backrest about the pivot and the lever being slidably mounted to the inner backrest at a location between the handle and the pivot.

15. The aircraft seat of claim 1, wherein the inner backrest is manually displaceable between the first position and the second position.

16. The aircraft seat of claim 3, wherein the inner backrest is pivotally and slidably mounted to the outer backrest.

17. The aircraft seat of claim 11, wherein the guide arrangement is configured such that the bottom end of the inner backrest remains adjacent to the base support surface when the inner backrest is displaced between the first position and the second position.

\* \* \* \* \*